(12) United States Patent
MacFarlane

(10) Patent No.: US 8,844,293 B2
(45) Date of Patent: Sep. 30, 2014

(54) FUEL SYSTEM FOR GAS TURBINE ENGINE

(75) Inventor: Ian A. MacFarlane, Saint Bruno (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 853 days.

(21) Appl. No.: 13/053,366

(22) Filed: Mar. 22, 2011

(65) Prior Publication Data

US 2012/0240593 A1 Sep. 27, 2012

(51) Int. Cl.
*F02C 7/224* (2006.01)
*F02C 7/047* (2006.01)
*F02C 9/26* (2006.01)

(52) U.S. Cl.
CPC ............... *F02C 7/224* (2013.01); *F02C 7/047* (2013.01); *F02C 9/263* (2013.01)
USPC ............. 60/736; 60/779; 60/734; 60/39.093; 244/134 R; 244/134 B; 244/134 D

(58) Field of Classification Search
CPC ............ F02C 7/047; F02C 7/22; F02C 7/224; F23R 3/28
USPC ................... 60/736, 778, 779, 734, 39.093; 244/134 R, 134 B, 134 D
See application file for complete search history.

(56) References Cited

U.S. PATENT DOCUMENTS

| | | | |
|---|---|---|---|
| 2,704,438 A * | 3/1955 | Sheets | 60/786 |
| 3,623,546 A | 11/1971 | Banthin et al. | |
| 3,707,074 A * | 12/1972 | Meyer et al. | 60/786 |
| 3,733,816 A | 5/1973 | Nash et al. | |
| 3,779,007 A * | 12/1973 | Lavash | 60/39.281 |
| 4,020,632 A * | 5/1977 | Coffinberry et al. | 60/773 |
| 4,364,355 A | 12/1982 | Karino | |
| 4,532,893 A | 8/1985 | Day et al. | |
| 4,790,370 A | 12/1988 | Niggemann | |
| 5,947,188 A | 9/1999 | Nestvall | |
| 6,065,280 A * | 5/2000 | Ranasinghe et al. | 60/774 |
| 6,396,692 B1 | 5/2002 | Farshi et al. | |
| 6,679,433 B2 * | 1/2004 | Gordon et al. | 237/12.1 |
| 6,931,834 B2 | 8/2005 | Jones | |
| 7,434,765 B2 | 10/2008 | Zielinski et al. | |
| 2009/0084108 A1 * | 4/2009 | Prociw et al. | 60/740 |
| 2010/0307157 A1 * | 12/2010 | Bilton et al. | 60/730 |

* cited by examiner

*Primary Examiner* — Phutthiwat Wongwian
*Assistant Examiner* — Steven Sutherland
(74) *Attorney, Agent, or Firm* — Norton Rose Fulbright Canada LLP

(57) ABSTRACT

A method and apparatus for heating fuel in an aircraft gas turbine engine, for example to provide fuel anti-icing to the fuel, comprises directing a fuel flow through a heat exchanger associated with a generator power conditioning unit as a sole means for providing anti-icing heating to fuel supplied for engine combustion. The method and apparatus permits the heat exchanger to heat the fuel sufficiently so that other dedicated heating means may be unnecessary.

15 Claims, 3 Drawing Sheets

FUEL SYSTEM FOR GAS TURBINE ENGINE

TECHNICAL FIELD

The described subject matter relates generally to an aircraft gas turbine engine and more particularly, to an improved fuel system therefor.

BACKGROUND OF THE ART

In an aircraft gas turbine engine, fuel is typically heated prior to delivery to a combustor in order to prevent ice formation in the fuel, among other reasons. A fuel-oil heat exchange system is typically provided to extract heat energy from the oil flow returning to the oil tank to heat a fuel flow. However, this dedicated equipment adds weight, cost and complexity to the engine and its oil and fuel systems, and hence improvement is desired.

SUMMARY

In one aspect, there is provided a method of anti-icing fuel in a fuel system of an aircraft gas turbine engine comprising the steps of: operating the engine to drive an electric generator, directing electricity output from the generator to a power conditioning circuit, directing a fuel flow through the heat exchanger thermally connected to the circuit, so that heat generated by the circuit in use heats the fuel, and using the circuit-heated heat exchanger as a sole anti-icing apparatus for the engine fuel system.

In another aspect, there is provided a fuel supply system in an aircraft gas turbine engine, comprising: a fuel tank; a pump communicating with the tank and at least one fuel nozzle of a combustion assembly; a fuel control metering device communicating between the pump and the at least one fuel nozzle; and an apparatus configured to in use provide substantially all anti-icing heating requirements of fuel in the system, the apparatus including a generator, a power conditioning circuit electrically connecting the generator, at least one fuel flow passage of the fuel supply system and a heat exchanger thermally connecting the circuit and the at least one passage, the apparatus configured to in use heat fuel passing through the at least one passage using electric energy consumed by the circuit, wherein the fuel system is free of any other dedicated anti-icing means.

Further details of these and other aspects of the described subject matter will be apparent from the detailed description and drawings included below.

BRIEF DESCRIPTION OF THE DRAWINGS

Reference is now made to the accompanying drawings, in which.

DETAILED DESCRIPTION

Figure 1:
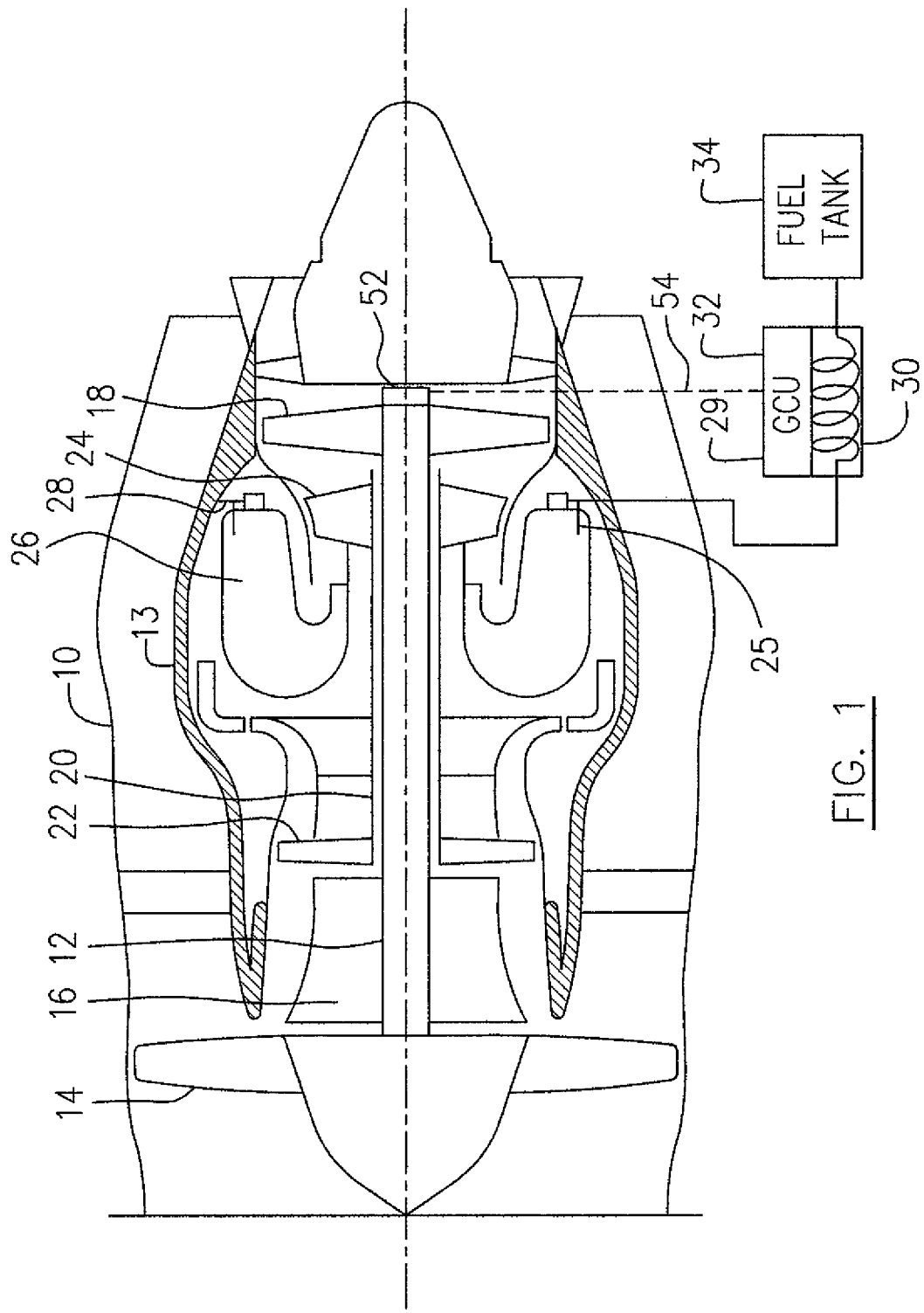
FIG. 1 is a schematic cross-sectional view of a gas turbine engine in accordance with the described subject matter.

Referring to FIG. 1, according to one embodiment an aircraft gas turbine engine includes a housing 10, a core casing 13, a low pressure spool assembly (not numbered) which includes a fan assembly 14, a low pressure compressor assembly 16 and a low pressure turbine assembly 18 connected by a shaft 12, and a high pressure spool assembly (not numbered) which includes a high pressure compressor assembly 22 and a high pressure turbine assembly 24 connected by a turbine shaft 20. The core casing 13 surrounds the low and high pressure spool assemblies to define a main flow path (not numbered) therethrough. In the main flow path there is provided a combustion gas generator assembly 26 to generate combustion gases for powering the high and low pressure turbine assemblies 24, 18. There is also provided a fuel supply system 28 including a heat exchanger 30 to heat a fuel flow introduced from a fuel tank 34, prior to being delivered via one or more fuel nozzles 25 to the combustor of the combustion gas generator assembly 26. At least one electric machine is mounted to the engine and configured to generate electrical power in response to the rotation of one of the engine shafts 12, 20. In this example, the machine is a permanent magnet generator 52 concentrically mounted with the shaft 12 at its aft end, though numerous other machine types, configurations and mounting locations are possible within the scope of the present description.

The heat exchanger 30 according to one embodiment is connected to the fuel tank 34 and the combustion gas generator assembly 26, as a sole means for heating an entire volume of fuel supplied by the fuel supply system 28 to the combustion gas generator assembly 26 for engine combustion. The heat exchanger 30 is associated with an electronic control apparatus, for example a generator power conditioning unit, referred to herein as a generator control unit 32 (GCU). The GCU 32 in this example receives power generated by the generator 52 in use, via an electrical connection 54, and may also provide for the control the generator as well as perform other functions. It is understood that power generated by generator 52 may be quite high, and hence significant heat may be generated within the GCU 32 in use. The GCU, therefore, may be thought of as a "heating apparatus" 29, which according to the present description may be used to heat the fuel flow passing through the heat exchanger 30.

Notably, as well, fuel supply system 28 is free of any other heat exchanger dedicated to heating the fuel, such as a fuel-oil heat exchanger of the type that is conventionally present in aircraft gas turbine engines of this sort, and the present approach hence may provide a fuel system that is lighter, cheaper and less complex (among other possibilities) relative to its conventional counterparts.

Figure 2:
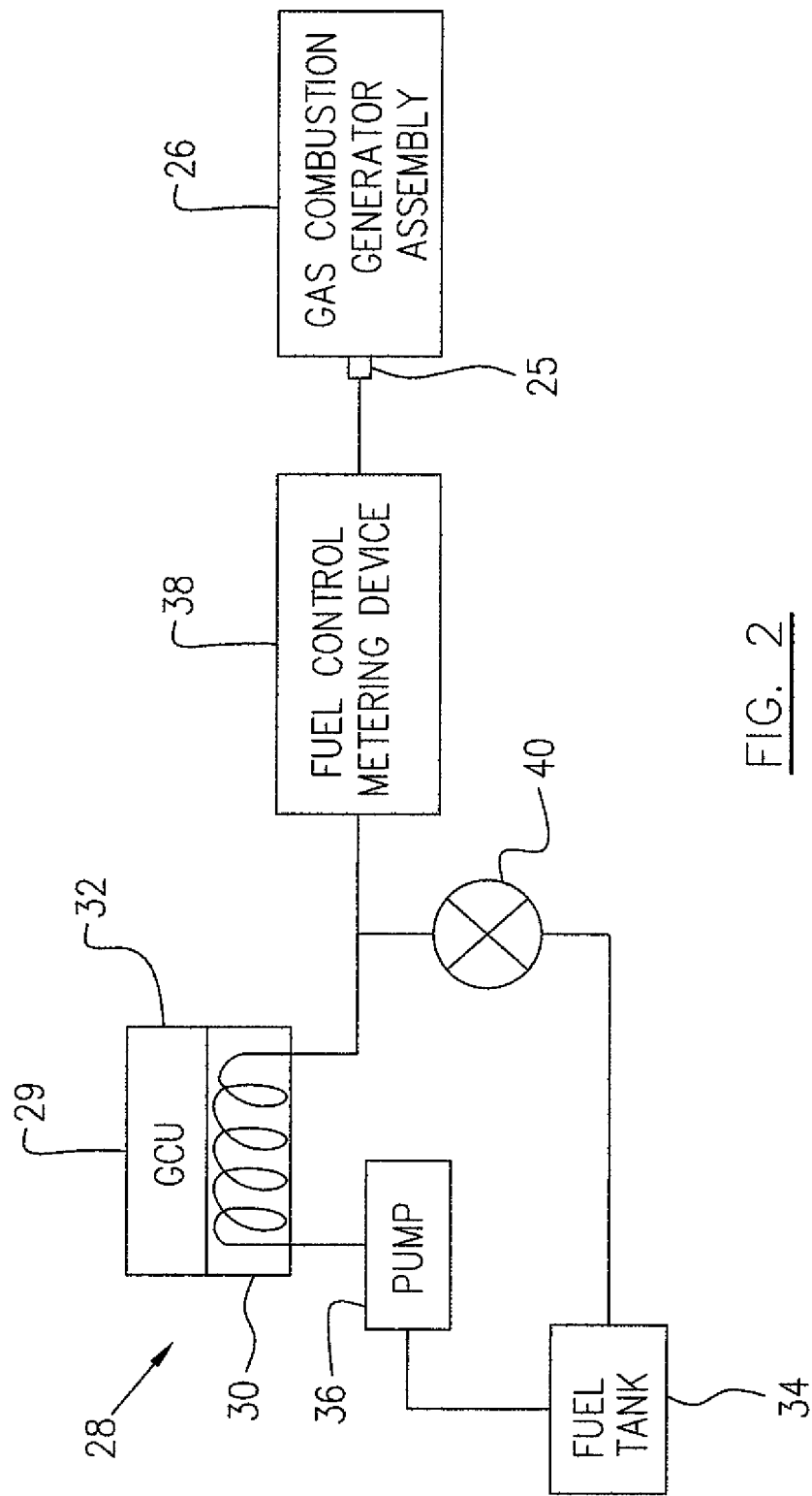
FIG. 2 is a schematic illustration showing one embodiment of the described subject matter.

In use, fuel is delivered via fuel system 28 to the combustor to operate the engine, in response to which shafts 12, 20 rotate. Such shaft rotation drives generator 52 to generate electricity, which is delivered to GCU 32 for conditioning prior to delivery to an engine and/or aircraft electrical system. In the process of conditioning the generator output, GCU 32 generates significant heat, which is dissipated via heat exchanger 30 to the fuel, thus cooling the GCU 32 while heating the fuel. In the embodiment of FIG. 2, the GCU 32 heat generation, heat exchanger efficiency and fuel heating requirements are selected such that the GCU 32 provides substantially all of the fuel heating that is required by the engine. In this application, "substantially all" means to the exclusion of any other dedicated heat exchanger interacting with the fuel system 28. As such, the engine is free from fuel-oil heat exchanger, and from any other dedicated fuel heating apparatus. In this application, a "dedicated" fuel heating apparatus is one which has a primary purpose of heating the fuel.

During engine operation, the fuel flow rate may vary, for example as a function of engine power setting—i.e. a high fuel flow rate may be required for take-off and a relatively lower fuel flow rate may be required during cruise. Therefore, it will be understood that a fuel flow passage(s) (not numbered) of the heat exchanger 30 may be sized to have a fuel flow capacity equal to the maximum fuel flow rate required during the engine maximum power operation. Alternately, fuel flow rate through the heat exchanger may be configured to be any suitable for the engine and conditions under consideration.

Measures may be taken to ensure that sufficient heat transfer is made to the fuel despite the varying fuel flow rates which might otherwise be present in the fuel system 28 during various phases of engine operation. For example, referring to FIG. 2, the fuel supply system 28 according to another embodiment, may include a fuel pump 36 configured to pump fuel through the heat exchanger 30 at a specified flow rate, regardless of the fuel flow rate being provided to the combustor at any particular point in time during engine operation. A return loop (not numbered) is provided through a flow control valve 40 to return fuel not needed for combustion back to the tank 34. In one example, the pump 36 is sized to provide a high rate of flow, such as is required during take-off or other high-power maneuvers. The fuel flow passing through the heat exchanger 30 in this embodiment is substantially continuously at the desired flow rate irrespective of flow rates provided to the combustor. A fuel control metering device 38 meters the flow delivered to the fuel nozzles 25 of the combustion gas generator assembly 26 of the engine, while the remainder (if any) is returned to the tank 34, as already mentioned. Hence, when engine operation requires a lower fuel flow, the fuel control metering device 38, which is located downstream in the fuel system 28 and downstream of the heat exchanger 30 according to this embodiment, may control the flow rate delivered to the combustion gas generator assembly 26 of the engine as required by the engine operation.

As mentioned, the fuel flow return passage (not numbered) which includes a flow rate control valve 40, may be provided for controllably directing a portion of the heated fuel flow discharged from the heat exchanger 30, back to the fuel tank 34. The control valve 40 may be controlled by or associated with the fuel control metering device 38 such that the portion of heated fuel flow passing through the fuel control metering device 38 is inversely related to the portion of heated fuel flow passing through the control valve 40 back to the fuel tank 34. During maximum engine power output, the control valve 40 will be closed and the maximum heated fuel flow will be directed through the fuel control metering device 38 to the gas combustion generator assembly 26 of the engine.

Figure 3:
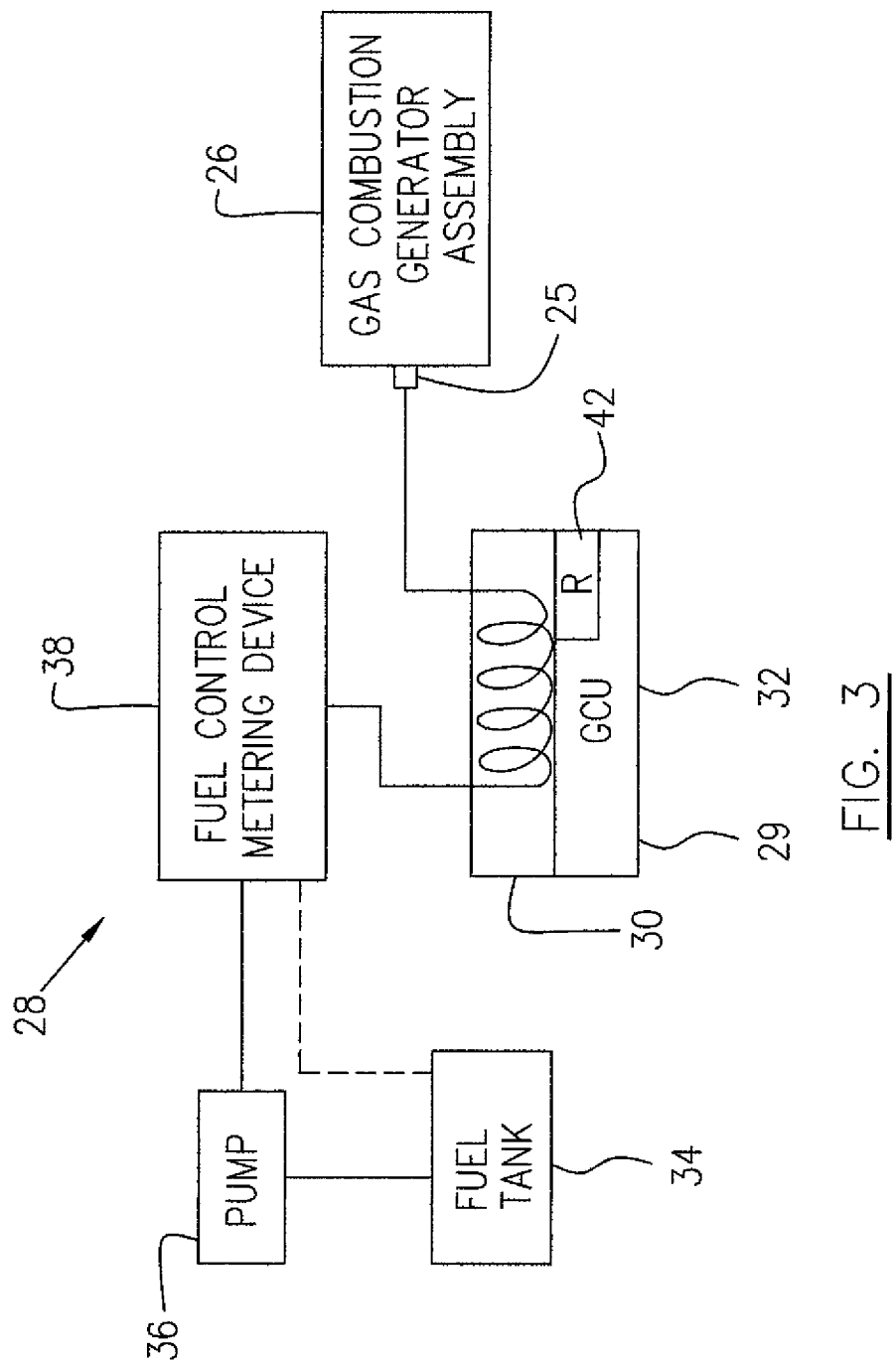
FIG. 3 is a schematic illustration showing another embodiment of the described subject matter.

In another example, depicted in FIG. 3, an auxiliary heater, such as an electric resistor 42, may be provided to supply additional heat on demand, such as when fuel flow rates through the heat exchanger 30 are high, to ensure adequate anti-icing (for example) of the fuel. As discussed further below, the pump 36 and fuel metering device 38 are also provided. In this example, the electric resistor 42 is not required by such an electric controlling circuit but is provided as part of the GCU 32 circuitry primarily for increasing the electric energy consumption associated with the GCU 32 in order to meet heat energy requirements of the fuel flow. The resistor 42 may be attached to the GCU 32, for example either inside or outside a housing of the GCU 32. The resistor 42 may be configured and positioned relative to the fuel flow and remainder of the GCU 32 such that the heat generated by the resistor 42 is substantially absorbed by the fuel flow passing through the fuel flow passage of the heat exchanger 30, before in preference to heating the other electronic components of the generator control unit 32, to thereby reduce an unnecessary heating of the GCU 32 electronics.

The fuel control metering device 38 according to this embodiment may be optionally located downstream of the heat exchanger 30. The fuel control metering device 38 adjusts the flow rate of the fuel flow passing through the fuel flow passage of the heat exchanger 30 to be heated by the electric heating apparatus 29, and then delivered to the gas combustion generator assembly 26 as required during engine operation. The fuel flow adjustment controlled by the fuel control metering device 38 may be achieved, for example by controlling the performance of the pump 36 to change the pump output, or by selectively directing a portion of pumped fuel flow back to the fuel tank through a returning passage as shown by a broken line in FIG. 3.

The resistor 42 may be switchable such that the resistor 42 does not function in certain situations, such as when less heat input is required to the fuel such as in the case that the fuel flow passing through the electric heating apparatus 29 is at less than maximum levels. Alternatively, the resistor 42 may be adjustable within a range (i.e. with a thermostatic or similar device) to control the heat output in some proportion to fuel flow, engine power, or other control parameter. For example, the total heat output associated with the heat exchanger 30 can be adjustably controlled substantially in accordance with the fuel flow rather through the fuel control metering device 38, in order to appropriately heat the fuel delivered to the fuel nozzles 25 of the gas combustion generator assembly 26 at various flow rates during engine operation.

The described concept may eliminate the need for additional or dedicated fuel heaters/heat exchangers to achieve anti-icing or other fuel heating objectives, and thus may provide cost and weight savings in aircraft gas turbine engines.

The above description is meant to be exemplary only, and one skilled in the art will recognize that changes may be made to the embodiments described without departure from the scope of the described subject matter. For example, any suitable engine type, architecture, generator system, auxiliary heating and/or fuel system type may be used. The fuel supply system in the aircraft gas turbine engine may include more components than those described and illustrated, such as more pumps, valves, etc. Still other modifications which fall within the scope of the described subject matter will be apparent to those skilled in the art, in light of a review of this disclosure, and such modifications are intended to fall within the appended claims.

The invention claimed is:

1. A method of anti-icing fuel in a fuel system of an aircraft gas turbine engine comprising the steps of: operating the engine to drive an electric generator, directing electricity output from the generator to a generator control unit (GCU) for conditioning the electricity output from the generator, directing a fuel flow through a heat exchanger thermally connected to the GCU so that heat generated by the GCU in a process of conditioning the electricity output from the generator is dissipated to the fuel flow, resulting in cooling the GCU while heating the fuel flow by using the heat exchanger as a sole anti-icing apparatus for the engine fuel system.

2. The method as defined in claim 1 wherein the heat exchanger has a fuel flow capacity of a flow rate required during engine operation at take-off.

3. The method as defined in claim 1 comprising selectively directing an entire volume of the fuel flow exiting the heat exchanger to a combustor for combustion.

4. The method as defined in claim 1 comprising selectively directing a first portion of the fuel flow exiting the heat exchanger to a combustor for combustion and a second portion of the fuel flow exiting the heat exchanger back to a fuel tank.

5. The method as defined in claim 4 comprising continuously directing the fuel flow through the heat exchanger at a maximum flow rate required during engine operation.

6. The method as defined in claim 1 comprising selectively adjusting a flow rate of the fuel flow directed through the heat exchanger.

7. The method as defined in claim 6 comprising selectively adjusting an electric energy consumption associated with the GCU substantially independent of power conditioning requirements and in accordance with the adjustment of the flow rate of the fuel flow directed through the heat exchanger.

8. The method as defined in claim 7 wherein the adjustment of the electric energy consumption associated with the GCU is achieved by adjusting electric current passing through an electric resistor as part of the GCU thermally connected to the heat exchanger.

9. A fuel supply system in an aircraft gas turbine engine, comprising:
a fuel tank;
a pump communicating with the tank and at least one fuel nozzle of a combustion assembly;
a fuel control metering device communicating between the pump and the at least one fuel nozzle; and
an apparatus configured to in use provide substantially all anti-icing heating requirements of fuel in the system, the apparatus including a generator, a generator control unit (GCU) electrically connecting the generator for conditioning electricity output from the generator, at least one fuel flow passage of the fuel supply system and a heat exchanger thermally connecting the GCU and the at least one passage, the apparatus configured to transfer heat generated by the GCU in a process of conditioning the electricity output from the generator, to fuel passing through the at least one passage, wherein the fuel system is free of any other dedicated anti-icing means.

10. The system as defined in claim 9 wherein the fuel control metering device is located downstream of the apparatus for adjustably directing a first portion of a heated fuel flow from the apparatus to the at least one fuel nozzle.

11. The system as defined in claim 10 further comprising a valve located downstream of the apparatus and upstream of the fuel control metering device for selectively allowing a second portion of the heated fuel flow to return to the fuel tank via a returning passage.

12. The system as defined in claim 9 wherein the apparatus comprises an electric resistor as part of the GCU, dedicated for increasing electric energy consumption associated with the GCU to meet a heat energy requirement of the fuel passing through the at least one fuel flow passage of the apparatus at a maximum flow rate.

13. The system as defined in claim 12 wherein the fuel control metering device is located upstream of the apparatus for adjusting a flow rate of the fuel passing through the at least one fuel flow passage of the apparatus.

14. The system as defined in claim 12 wherein the electric resistor is electrically switchable between an "on" and "off" condition.

15. The system as defined in claim 12 wherein the electric resistor is adjustable for a required electric energy consumption associated with the GCU.

* * * * *